Feb. 27, 1962     I. V. ABADJIEFF     3,022,609
DRILL SHARPENER AND POINT THINNER
Filed July 18, 1957     4 Sheets-Sheet 2
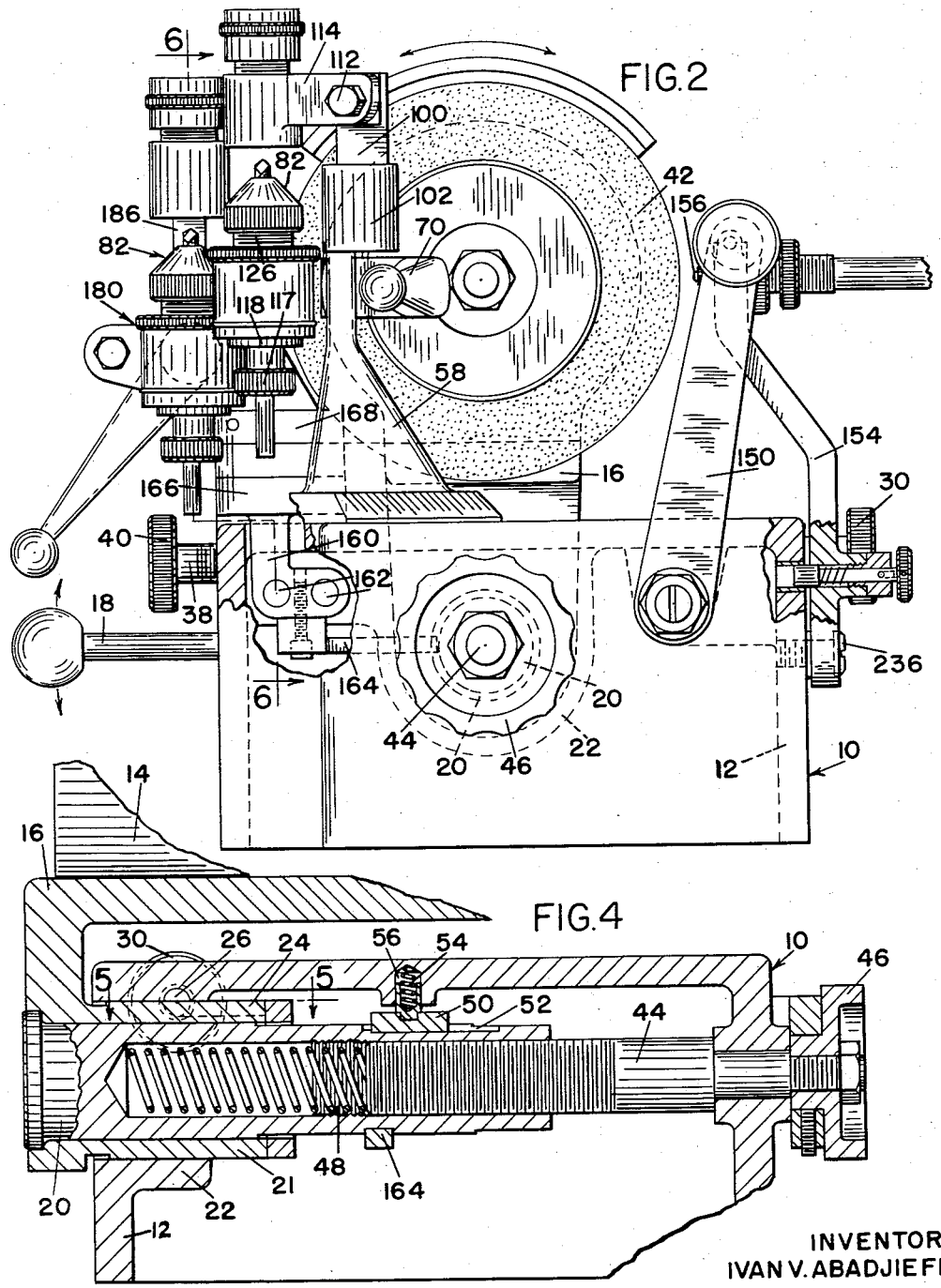
INVENTOR
IVAN V. ABADJIEFF
*Charles R. Jay*
ATTORNEY Feb. 27, 1962     I. V. ABADJIEFF     3,022,609
DRILL SHARPENER AND POINT THINNER
Filed July 18, 1957     4 Sheets-Sheet 3
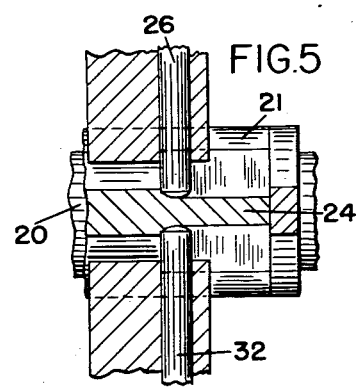
FIG.5
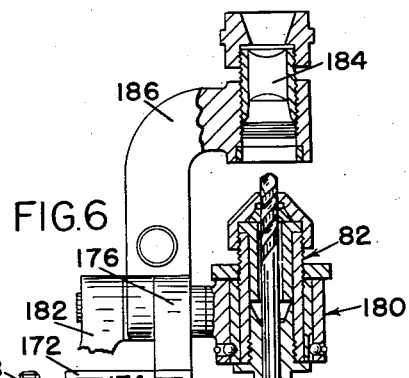
FIG.6
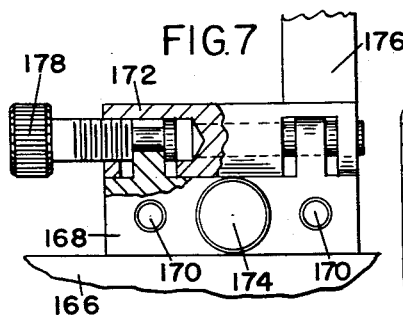
FIG.7
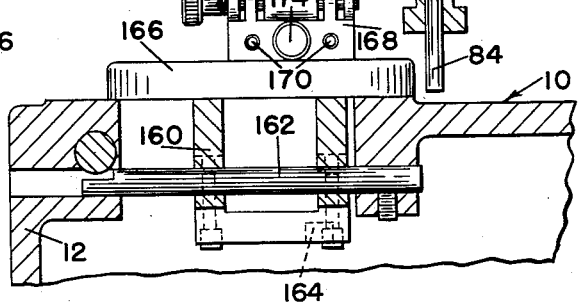
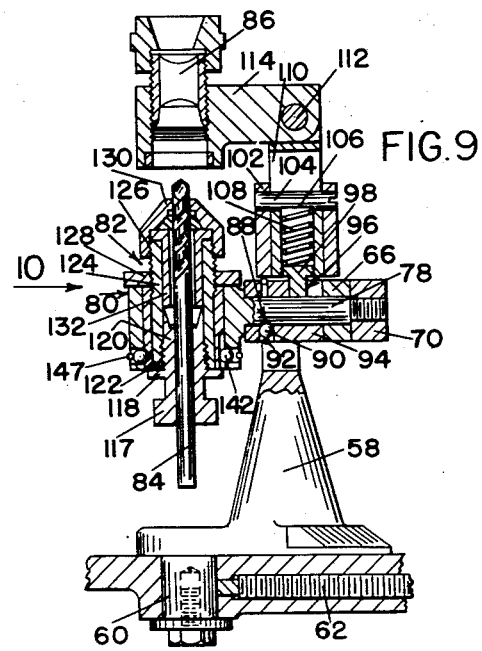
FIG.9
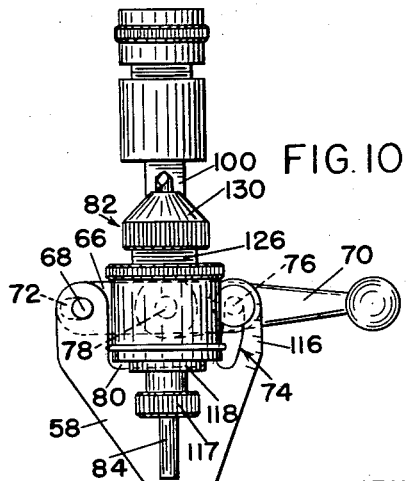
FIG.10
INVENTOR
IVAN V. ABADJIEFF
Charles R. Jay
ATTORNEY

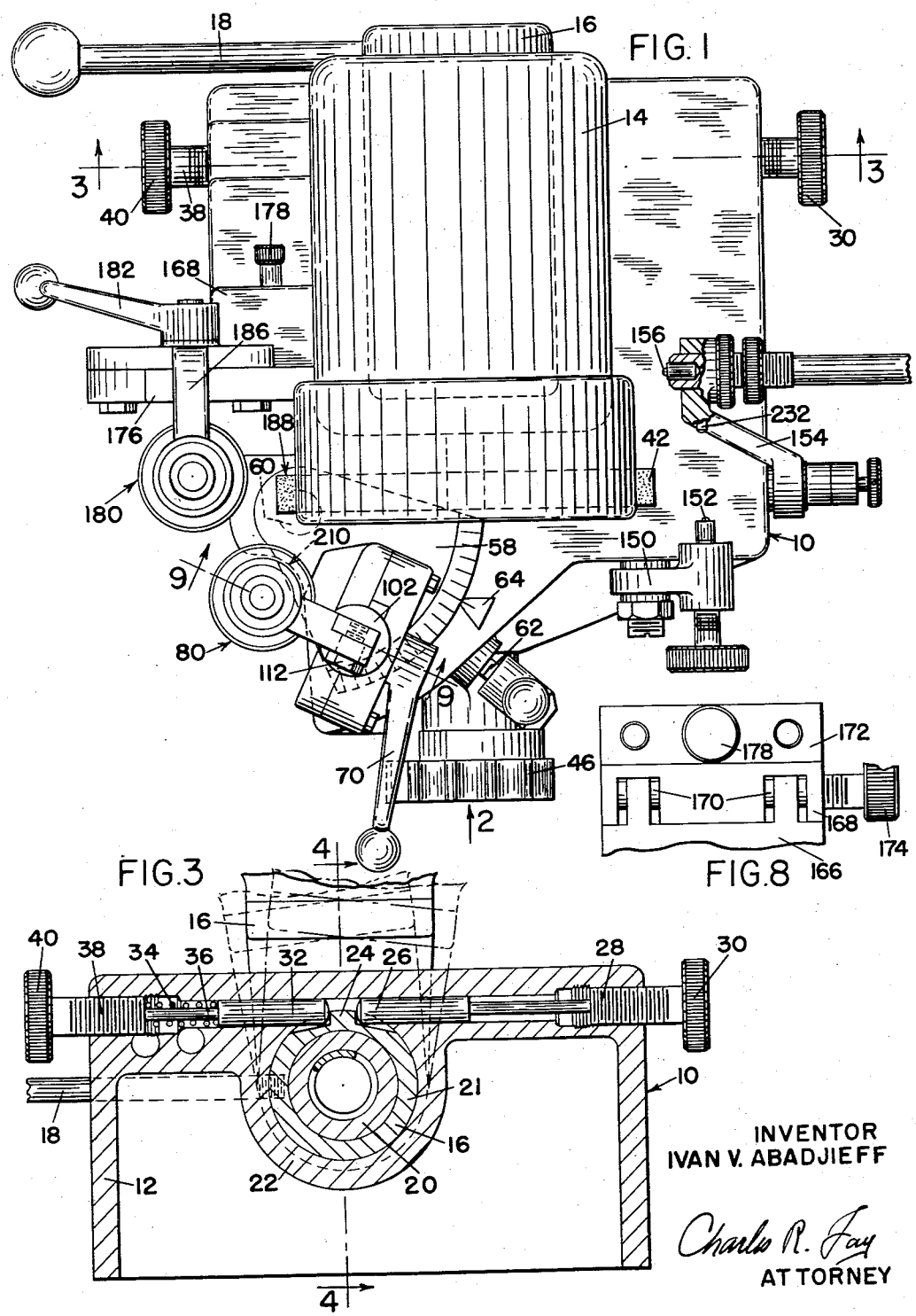

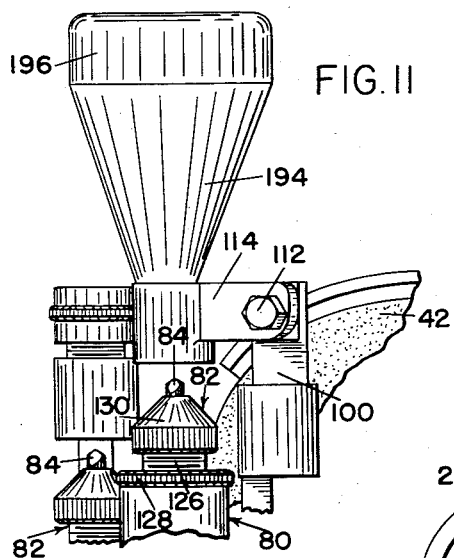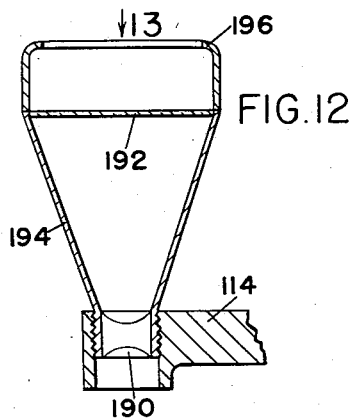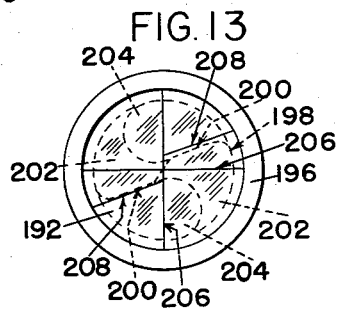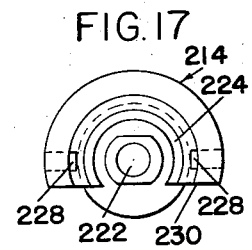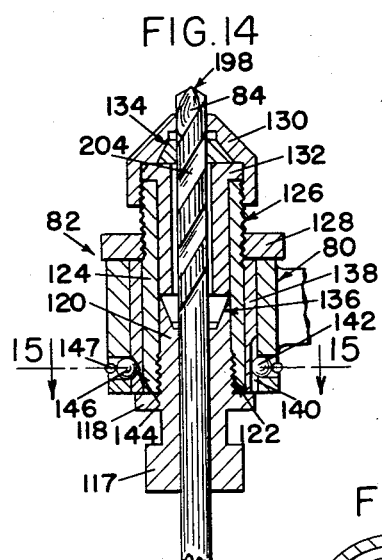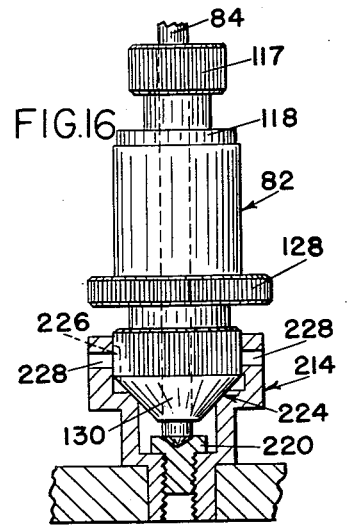
INVENTOR
IVAN V. ABADJIEFF
Charles R. Fay
ATTORNEY 3,022,609
DRILL SHARPENER AND POINT THINNER
Ivan V. Abadjieff, Worcester, Mass., assignor to Leland-Gifford Company, Worcester, Mass., a corporation of Massachusetts
Filed July 18, 1957, Ser. No. 672,837
7 Claims. (Cl. 51—55)

This invention relates to a new and improved apparatus for quickly, easily and accurately sharpening drills by grinding the same and also including new and improved apparatus for thinning the points of the drills.

The principal object of the invention resides in the provision of an easily operated drill-holding chuck having selective positions for griding and for observation by means of a magnifying lens, particularly a projection lens including comparator lines formed on a screen for accurate adjustment of the chuck and the drill therein in a special receiver while under observation, and including an inclined line or lines for observation of the cutting angle, said receiver being mounted for adjustment of the chuck angularly with respect to a grinding wheel, the adjustment being carried out while in the observation position, and including means to effect the adjustment of the chuck and drill while maintaining the vertical focussed relation of the lens on the drill point regardless of the angular adjustment made.

Further objects of the invention include the provision of a base, a motor and an abrasive wheel driven thereby mounted on the base for sharpening and pointing the drill, a standard swivelly mounted on the base in operative relation to the abrasive wheel, there being a rockable arm on the standard, said arm being mounted on an axis generally at right angles to the swivel axis of the standard, a drill holding chuck which is itself of novel construction, and means mounting the chuck on the rockable arm by a device which provides that the drill held in the chuck shall be maintained in constant relation at all times with respect to the viewing device, the constant relationship being maintained regardless of the adjustment of the rocker arm in order to obtain varying degrees of clearance angles of sharpening of the drill.

A further object of the invention resides in the provision of a second receiver for said chuck mounted to move with a movable mounting for the motor, said movable mounting bringing the wheel accurately to the drill and determining the depth of cut on the drill, said second receiver providing a thinning attachment for the point of the drill so that the thinning operation is very accurate and is maintained at all times in proper relationship with respect to the wheel; and including new and useful adjustment means for providing desirable variation for the amount of cut in the thinning operation, and an adjustment at right angles thereto controlling the type of cut providing for any desired amount of point or even a negative point.

Further objects of the invention reside in the provision of new and useful wheel dressing devices; in the specific application of the mount for the motor and the accurate determination of the limits of motion thereof; the provision in the new and useful drill holding chuck and receivers, therefor providing an accurate 180° reversal of the drill for grinding both sides thereof and providing for holding the drill in proper thinning relation merely by removing the chuck with the drill therein from the receiver for the sharpening operation to the other like receiver to acomplish the thinning operation, with means predetermining the correct position of the drill in the latter operation; and means providing for the reception of drills of any length to be processed.

Other objects and advantages of the invention will appear hereinafter.

Reference is to be had to the accompanying drawings, in which

FIG. 1 is a plan view illustrating the invention;
FIG. 2 is a view in elevation thereof, parts being broken away and in section and looking in the direction of arrow 2 in FIG. 1;
FIG. 3 is a section on line 3—3 of FIG. 1;
FIG. 4 is a section on line 4—4 of FIG. 3;
FIG. 5 is a section on line 5—5 of FIG. 4;
FIG. 6 is a section on line 6—6 of FIG. 2;
FIG. 7 is an enlarged view, partly in section illustrating one of the adjustments for the thinning attachment;
FIG. 8 is a similar view showing the other adjustment for the thinning attachment;
FIG. 9 is a sectional view on line 9—9 of FIG. 1;
FIG. 10 is a view in elevation, looking in the direction of arrow 10 in FIG. 9;
FIG. 11 shows a modified form of viewing attachment in elevation;
FIG. 12 is a section therethrough;
FIG. 13 is a view illustrating the appearance of the drill to be sharpened as seen in the glass of the projection viewer of FIG. 12;
FIG. 14 is an enlarged section of a drill chuck and receiver;
FIG. 15 is a section on line 15—15 of FIG. 14;
FIG. 16 is a section through a drill point projection gauge; and
FIG. 17 is a plan view of the gauge.

In carrying out the present invention, attention is first directed to FIGS. 1 and 2 wherein there is shown a machine base generally indicated at 10. This base is preferably raised by means of a surrounding flange 12 which is adapted to be set upon a bench or table and upon which the drill sharpener and point thinner is mounted.

A motor 14 is mounted on a standard 16, the latter being oscillatably mounted on the base 10 preferably within the same and as shown in FIGS. 3 and 4 standard 16 is mounted horizontally on opposite portions of the flanges 12. A handle 18 is provided on the standard for oscillating the motor in order to carry out the sharpening action for the drill as will become more apparent hereinafter.

Standard 16 is mounted to oscillate on bearing member or sleeve 20 and the standard 16 has a cylindrical portion 21 surrounding this bearing or sleeve 20 as clearly shown in FIG. 3, said cylindrical portion being oscillatably supported in a boss or the like 22 formed on a flange 12.

The cylindrical portion of the standard 16 is provided with an upstanding projection 24 formed by indentations at either side thereof, and this is adapted to abut the inner end of an adjustable stop member 26 adjustably mounted in-and-out by a screw 28 manipulated by a thumbpiece 30 as clearly shown in FIG. 3. When the standard 16 and motor 14 are moved as for instance to the dotted line position in FIG. 3, the stop projection 24 engages a slidable member 32 located oppositely the stop member 26 and by this means tends to compress a spring 34 mounted on a rod 36. This rod is slidable with respect to an adjustable threaded member 38 adjusted by a member 40 for the purpose of providing for variable tension on spring 34. Thus the motor will always be moved back to its upright position by spring 34 when moved from solid line position in FIG. 3 to dotted line position therein; and the standard 16 also has a motion in the opposite direction to the dot-and-dash line position wherein it is stopped by member 26 which may be adjusted to vary the position of limit of travel of standard 16 in this direction.

The motor 14 is provided with an abrasive wheel 42 which in this case is directly mounted on the shaft. This wheel moves with the motor in the oscillatory motion thereof during the sharpening operation for the drill.

The entire motor and wheel assembly is movable axially of the motor by proper manipulation of a threaded shaft 44 manipulated from the front of the machine by a hand wheel 46 which is secured to an extending end thereof as clearly shown in FIG. 4. The threaded shaft 44 is threadedly engaged with an internally threaded hollow portion in the bearing or sleeve 20 as indicated at 48 and the bearing or sleeve 20 is held against rotation by means of a key 50 slidably engaged in a slot 52 in sleeve 20, the key being springpressed into engagement therewith as by a spring 54 located in a cavity 56 in the top member of the table 10.

As the hand wheel 46 is rotated, the sleeve 20 will be appropriately moved longitudinally, carrying with it standard 16, motor 14 and the abrasive wheel 42 for the purpose of adjusting the depth of cut to be taken from the drill in order to properly sharpen the same.

Mounted on the top of the table 10, there is provided a standard 58 swively mounted on a vertical axis as for instance by a pin 60 or the like. A locking screw 62 may be provided to engage the pin 60 to hold the standard with reference to a zero indicating mark 64, see FIG. 1. The angle of the standard is angularly re-positioned with respect to the plane of the abrasive wheel 42 to vary the angle of the point of the drill.

On the standard there is provided a rockable arm 66 mounted on a horizontal pin 68 on standard 58 as shown in FIG. 10. The rockable arm 66 is provided with an elongated slot 72 so that arm 66 may move rectilinearly as well as pivotably. The motion of the arm, however, is accurately controlled by means of a special arcuate cam slot 74 in standard 58 and a pin 76 extends through the slot into the arm 66. By this means, as arm 66 moves through an arc on pin 68, it is also controlled to move to a predetermined rectilinear degree to provide for accuracy of adjustment of the drill to be sharpened as will be hereinafter more fully described.

Arm 66 is provided with a cross-pin 78 which may be rotated therein and upon which an annular receiver generally indicated at 80 is fixed in out-board relation to the standard 58. This receiver holds the drill-holding chuck generally indicated at 82 with the drill 84 therein in two positions as the receiver is held in supported relationship on the pin 78. A handle 70 is provided to turn the pin and the receiver. These two positions are the grinding position wherein the drill is turned so that the point of the drill engages the wheel to be ground, and the other being a viewing position as illustrated in FIG. 9 wherein the point of the drill is observed on a magnified scale through a lens 86.

The pin 78 is provided with a detent 88 in which a ball 90 is adapted to be spring-pressed by an O-ring 92. Whereas the receiver 80 may be grasped to turn the drill with respect to the lens 86 in order to carry out the grinding or sharpening function; nevertheless the receiver is always held in upright position with relation to the lens 86 by reason of the snapping of ball 90 into the recess 88. This is the observing position and the chuck is always maintained in exact relationship with respect to the lens 86, in this position.

The arm 66 is provided with a sleeve 94 in which the ball 90 and O-ring 92 are conveniently mounted, and this sleeve also is provided with an opening 96 in which is received a headed pin 98, said pin being secured as by screw-threads to a sleeve 100.

The standard 58 is provided with a cylindrical extension or sleeve 102 in which is fixed a cross-pin 104 having a notch 106 receiving a spring 108 which finds its reaction points in the notch 106 in the pin 104, and the head of pin 98. The sleeve 100, however, is free to move up and down in the extending portion 102 of standard 58 and for this purpose there is provided a cross slot 110 in member 100 which extends above the member 102 and is provided with a cross-pin 112 mounting a pivoted bracket 114 which mounts the lens 86 in vertical position as shown in FIG. 9.

When the arm 66 is adjusted according to a scale 116 (FIG. 10) in order to vary the relief angle of the point of the drill, the receiver 80, chuck 82 and drill 84 are still always maintained in correct lateral position relative to the lens by reason of the rectilinear motion of the arm 66 as constrained by the slot 74 acting as a cam as well as being utilized to hold the adjustment by pin 76. Thus the vertical position of the drill point is changed but not the horizontal position. At the same time, however, a vertical component is imparted to the receiver 80, and the lens itself is therefore also vertically moved in like degree, maintaining the relationship of the parts so that the drill point is still in focus by reason of the fact that as pin 78 moves down with arm 66, the spring 108 bearing upon fixed pin 104, causes member 100 to move downwardly, carrying with it lens 86 and always maintaining the members in proper focus with respect to the point of the drill.

The chuck itself comprises a finger-hold portion 117 and it has a flange 118. The member 117 extends inwardly of the chuck as at 120 and is externally screw-threaded at 122 to a surrounding sleeve 124, which in turn is externally screw-threaded at 126 to receive a nut 128 and a cap 130. The expanding chuck fingers are indicated by the reference numeral 132 and the cap provides inclined internal surfaces 134, the finger-hold portion 117 providing inclined surfaces 136 which between them engage the chuck fingers 132 and compress the same to hold the drill 84.

The sleeve 124 is freely slidable in another sleeve 138 but when nut 128 is rotated on sleeve 124, sleeve 138 is removably clamped between flange 118 and the nut.

In order to provide for a complete and accurate 180° reversal of the chuck in the receiver, the sleeve 138 is provided with an external longitudinal groove 140 receiving a ball 142 and a chordal groove 144 receiving a ball 146, these being held in position by an O-ring.

By grasping the chuck and turning it so that balls 142 and 146 are forced out of their respective grooves, the entire chuck is rotatably movable in the receiver so as to give a 180° turn which is determined by the fact that the ball 146 will snap into the groove 140 and the ball 142 will snap into the recess 144. Groove 140 maintains the chuck against accidental rotation and recess 144 maintains the chuck against vertical displacement.

Shown at 150, there is an oscillating holder for a diamond-point 152 and there is a second one pivoted to the member 154 for a diamond-point 156. These are for dressing the wheel. The wheel may be dressed on its face by diamond-point 152 merely by advancing the motor to the proper position by the hand wheel 46 and then operating the pivoted member 150 in a conventional manner; and the edge of the wheel is dressed by the diamond-point 156 by backing off on the said actuator member 30 to allow the wheel 42 to come into the operating range of this diamond bit.

There is a bracket 160 mounted within the base 10 to slide on a pair of rods 162 parallel to the rectilinear motion of the motor. This bracket is provided with an arm 164 that extends inwardly as shown in FIG. 2 to engage in a groove in the bearing or sleeve 20 so that the bracket 160 is constrained to move rectilinearly with member 20 under influence of hand wheel 46. The bracket 160 extends upwardly through a slot in the table and mounts thereon a slidable base 166 in turn mounting a block 168 which carries a pair of rods 170 in turn slidably mounting another block 172. Block 172 is adjustable by means of a thumb-piece 174 which has a screw shaft thereon engaged with block 172. Block 172 mounts an upright 176 which is adjustable transversely to the adjustment of block 172 by means of a thumb-piece 178 having a screw-threaded rod engaged therewith as clearly shown in FIG. 7.

The upright 176 mounts thereon a receiver 180 which is exactly of the same construction as receiver 80 and is adapted to receive the chuck 82 therein in exactly the same manner. Also the receiver 180 is mounted for pivotal motion on a horizontal axis by means of a handle 182 and a magnifying lens 184 may be mounted upon bracket 186 to observe the point of the drill 84 to determine the thinning action which is accomplished by this particular means.

The bracket 160 and standard 176 are seen to be movable with the motor 14 so that the exact relationship of any drill in any chuck in receiver 180 will always be exactly the same relative to the rear face of the abrasive wheel as is indicated by the reference numeral 188 in FIG. 1. Therefore no matter what the adjustment of depth of cut by reason of the longitudinal adjustment of the motor, the thinning action will take place with accuracy without rearranging the position of the receiver 180 relative to the motor.

It may be preferable to utilize a projection lens 190 which is to replace the lens 86 so as to magnify the image of the drill point on a transparent screen or ground glass 192 mounted in a conical opaque support 194. A hood 196 keeps out incidental light and allows the drill point to be seen as shown in FIG. 13. The drill point in general is indicated at 198, the cutting edges at 200, the areas that are ground off to sharpen the edges are shown at 202, and the flutes at 204. Centering cross lines 206 are formed on the glass 192 and inclined lines 208 serve to show alignment or misalignment of the cutting edges at 200. Since the screen or glass 192 is conveniently about 2¼ inches in diameter, and the lens 190 may be arranged for 8 areas of magnification on the screen, a ¼" drill point substantially fills the screen and the smallest drill is easily seen.

In order to accommodate large drills and those having long shanks, the table 10 is recessed at 210 in the area of the receiver 80 in observation position, see FIG. 1. By this means, any drill may be accommodated, as the vertical position of the drill is unobstructed, and in grinding position, the drill is of course at an incline to the table.

In operation, a drill to be sharpened is placed in the chuck and the chuck inserted in the drill point projection gauge to be described. The cap 130 is tightened after properly positioning the chuck and drill rotatively. Then the chuck with drill firmly in place is placed in receiver 80 and is held therein by tightening nut 128 after the proper rotative position is obtained by observation of the point of the drill through the lens. The proper relief angle is obtained by the proper setting of the rocker arm 66, and the angle of the point is set by the angle of the standard itself. Then the receiver is brought forwardly by swivelling on pin 78, the wheel 42 fed to the depth of cut desired by hand wheel 46, and the motor is oscillated to make the cut.

The chuck is then turned exactly 180° in its receiver as determined by the balls 142 and 146, and the other side of the drill is sharpened also, in exact conformance to the first operation.

The chuck is then removed, replaced in receiver 180, observed, adjusted, and thinned at the point by turning the receiver 180 by the handle 182 to the desired amount. The longitudinal and lateral adjustments of standard 176 are made first, of course, if desired or necessary.

As shown in FIG. 16, an adjustable gauge is provided for predetermining the extension of the drill from the cap of the drill holding chuck. This device comprises a fixture 214 which is generally hollow and has a narrow end at 216 which may be pressed or tapped into a hole in a support such as the table 10 or the motor housing, or at any convenient location. The narrow end 216 is threaded internally at 218 and receives a gauge element or stop 220 which is adjustable therein axially thereof, and has a conical depression at 222 to receive and position the point of the drill to be processed.

The fixture is provided with a beveled portion or stop 224 to receive and stop the cap 130, and the cap has flats or longitudinal grooves 226 received by radial, inwardly directed pins 228 on the fixture to hold the cap against rotation.

In use, the chuck is inserted in the fixture with the drill loose therein, so that the point of the drill finds and is stopped by the gauge element 220. The cap is turned until the grooves 226 coincide with pins 228, and the cap drops to the bevel 224, being locked against rotation. The drill now extends to the degree desired from the cap.

By then tightening the finger piece 117, the drill is locked in the chuck, and the chuck may then be removed from the gauge device and placed in the appropriate receiver for the sharpening or thinning operation as above described. The fixture may be open at the side as at 230 in FIG. 17 for observation and ease in adjusting the element 220, the opening being less than one-half of the fixture in order to provide for proper holding of the chuck as described.

When the face of wheel 42 and diamond-point 152 wear, means is provided to gauge the tip of a new diamond-point to bring it in alignment with the proper plane, i.e. with respect to the axis of the standard 58. This gauge comprises a button 232 on the arm 154 which aligns with point 152 and forms a stop to which to adjust point 152 by wheel 234. In turn, arm 154 is stopped against a stop 236 in proper gauging position thereof. Arm 154 is brought forward as far as its stop permits, and then the point 152 is adjusted to the button 232.

Having thus described my invention and the advantages thereof, I do not wish to be limited to the details herein disclosed, otherwise than as set forth in the claims, but what I claim is:

1. Drill sharpening device comprising a base, a movable support on said base, a motor on said support, a grinding wheel driven by said motor, means moving said motor and wheel axially, means to move said motor and wheel laterally, means for releasably holding a drill to be ground by the wheel, said means comprising a standard, means swivelly mounting said standard on an axis normal to the axis of the motor, a swivel pin on an axis normal to the axis of motion of the standard, a drill-holding chuck on said swivel pin, a rocker arm on said standard, the swivel pin being mounted on the rocker arm, a pivot-pin on the standard for said rocker arm, means for angularly moving the rocker arm to angularly adjust the drill chuck and a drill held thereby, means to rectilinearly move the rocker arm as it is angularly moved to maintain the lateral placement of the drill chuck, a magnifying lens mounted on said standard, means mounting said magnifying lens for motion parallel to the standard axis, the point of the drill being located in focus with respect to said magnifying lens when said rocker arm is in a predetermined position of adjustment, said rocker arm and chuck being moved with respect to said magnifying lens upon angular adjustment of the rocker arm, and inter-engaging means between the swivel pin for the drill holding chuck and said magnifying lens effective to cause the latter to move in the direction of the motion of the drill chuck as the latter is moved by adjustment of the rocker arm to keep the drill point in constant focus with respect to the lens regardless of the angular adjustment of the drill chuck, and to hold the drill in vertical position with respect to said base regardless of the adjustment of the rocker arm.

2. A drill grinding and point thinning apparatus comprising a base, a motor mounted thereon, means for imparting axial motion to said motor, a first standard, a swivelled drill holder thereon, a drill grinding tool on said motor to be driven thereby, said motor and tool being advanced to the drill holder by said means, a second standard, a swiveled drill holder on said second standard for moving a drill between an operative position with respect to an edge of said grinding tool and a non-operative position in a direction transverse to the direction of motion of the motor and tool, means connecting said second standard with said motor for simultaneous motion of the second standard with the motor, and means mounting said motor for motion normal to the axis thereof for moving the grinder into operative relation with a drill held in said second-named drill holder.

3. A drill grinding and point thinning apparatus comprising a base, a motor mounted thereon, means for imparting axial motion to said motor, a first standard, a swiveled drill holder thereon, a drill grinding tool on said motor to be driven thereby, said motor and tool being advanced to the drill holder by said means, a second standard, a swiveled drill holder on said second standard for moving a drill between an operative position with respect to an edge of said grinding tool and a non-operative position in a direction transverse to the direction of motion of the motor and tool, means connecting said second standard with said motor for simultaneous motion of the second standard with the motor, means mounting said motor for motion normal to the axis thereof for moving the grinder into operative relation with a drill held in said first-named drill holder, and a single drill holding chuck receivable selectively in either holder, said holders being similar in construction.

4. The apparatus of claim 3 including interengaging means on each holder, and the chuck for holding the latter selectively in either of two positions 180° apart.

5. The apparatus of claim 3 including interengaging means on each holder, and the chuck for holding the latter selectively in either of two positions 180° apart, said interengaging means including resilient means to resist dislodgment of the chuck but yielding under manual manipulation.

6. A drill grinding and point thinning apparatus comprising a base, a motor mounted thereon, means for imparting axial motion to said motor, a first standard, a swiveled drill holder thereon, a drill grinding tool on said motor to be driven thereby, said tool being advanced to the drill holder by said motor moving means, a second standard, a swiveled drill holder on said second standard for moving a drill between an operative position with respect to an edge of said grinding tool and a non-operative position in a direction transverse to the direction of motion of the motor and tool, means connecting said second standard with said motor for simultaneous motion of the second standard with the motor, and means mounting said motor for motion normal to the axis thereof for moving the grinder into operative relation with a drill held in said first-named drill holder, means for individually adjusting the second standard as a body toward and away from the grinding tool for depth of cut, and means to adjust the standard axially of the motor for adjustment in type of thinning cut to be made.

7. The drill sharpening device as recited in claim 1 wherein the rocker arm holds the drill in vertical position with respect to said base regardless of the adjustment of the rocker arm while the drill point is in said constant focus with respect to the lens, and means forming an indentation in said base for accommodating drills of length greater than the distance between the chuck and the base when in observation position in the chuck.

References Cited in the file of this patent

UNITED STATES PATENTS

| | | |
|---|---|---|
| 1,149,552 | Coleman | Aug. 10, 1915 |
| 1,472,748 | Drescher | Oct. 30, 1923 |
| 1,941,977 | Evans | Jan. 2, 1934 |
| 2,024,268 | Bausch et al. | Dec. 17, 1935 |
| 2,401,594 | Wallace | June 4, 1946 |
| 2,484,404 | Doerfler | Oct. 11, 1949 |
| 2,619,779 | Kristenson | Dec. 2, 1952 |
| 2,629,936 | Cronstedt | Mar. 3, 1953 |
| 2,713,755 | Ganahl | July 26, 1955 |
| 2,736,147 | Michelson | Feb. 28, 1956 |